Figure 1:
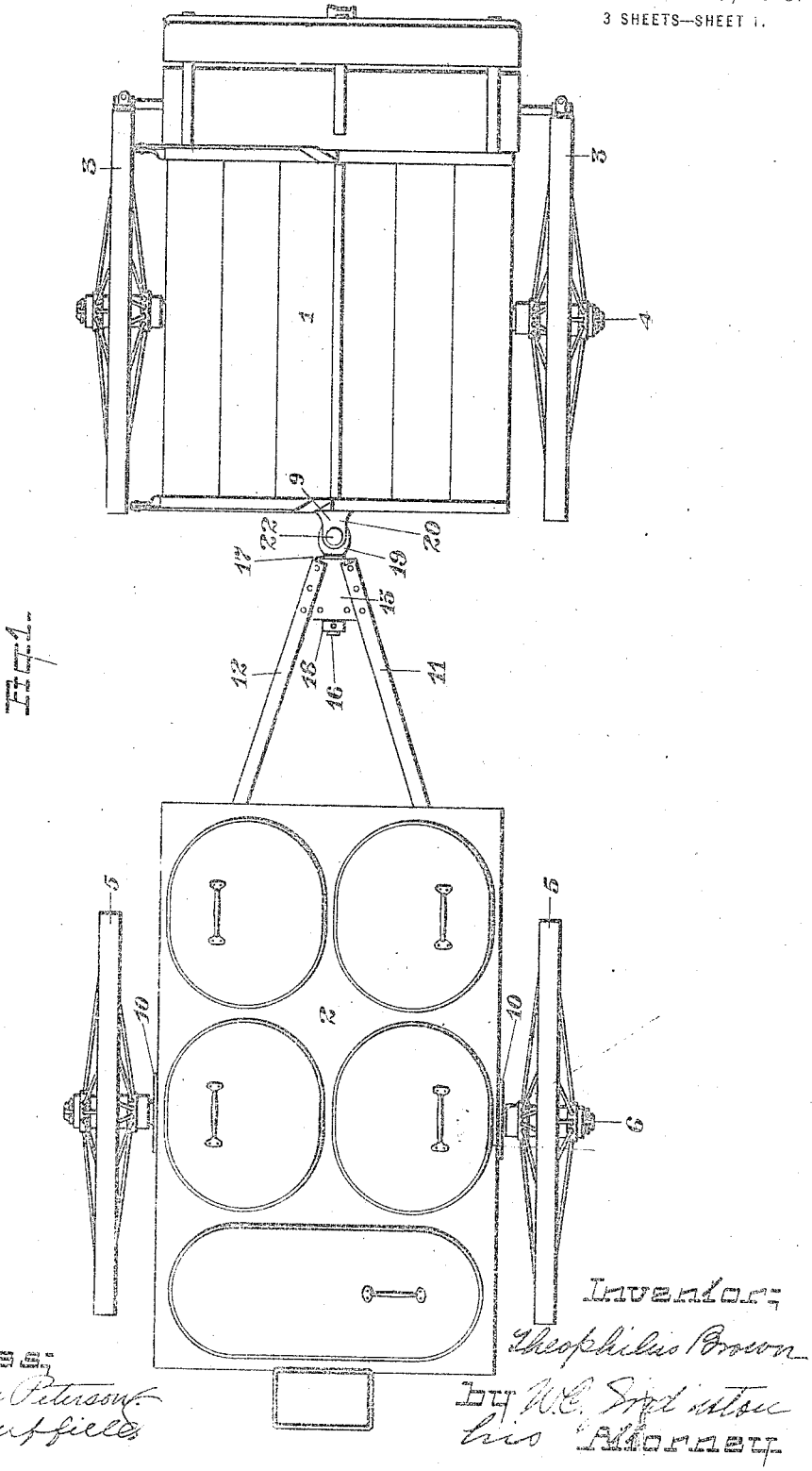

I. BROWN.
COUPLING FOR VEHICLES.
APPLICATION FILED AUG. 9, 1915.

1,163,611.

Patented Dec. 7, 1915.
3 SHEETS—SHEET 1.

Witness:
Martin Peterson
W. S. Duffield

Inventor:
Theophilus Brown
By W. C. Syddleton
his Attorney

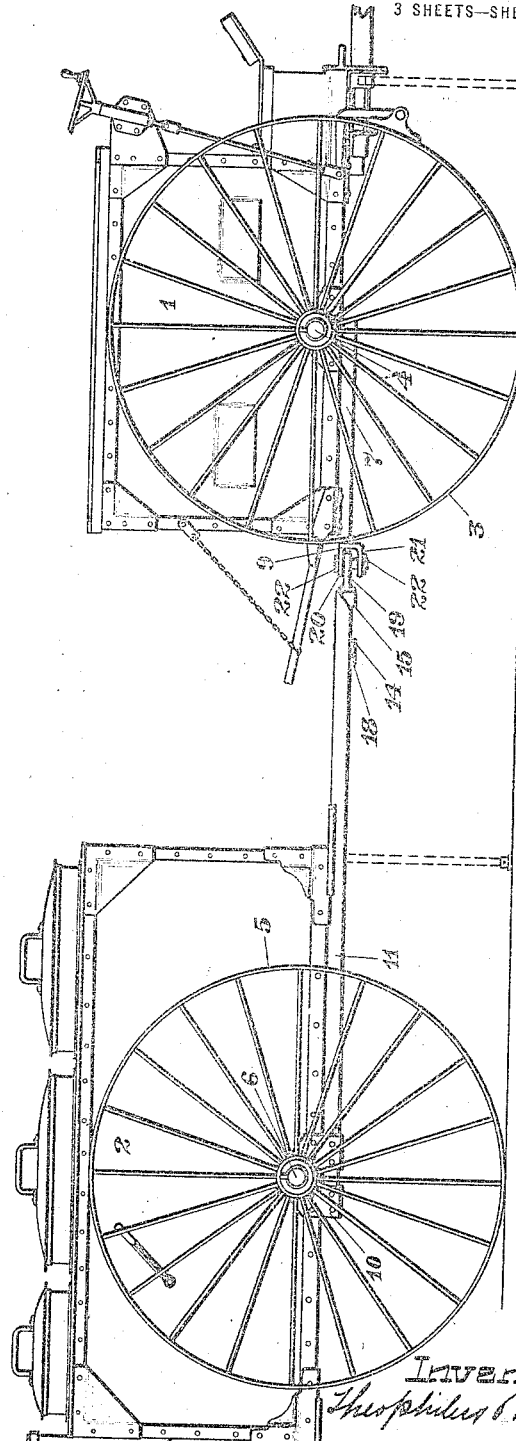

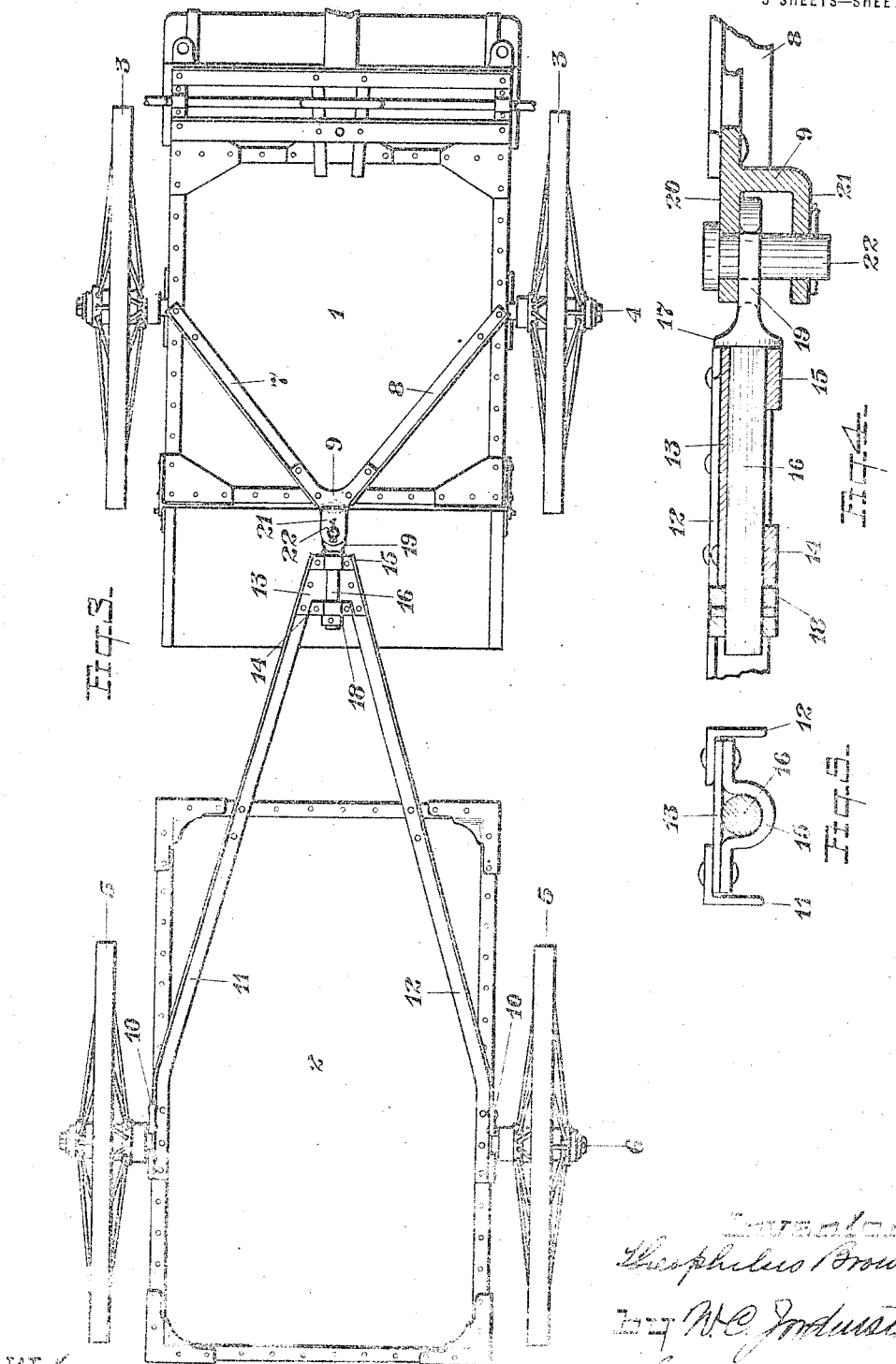

UNITED STATES PATENT OFFICE.

THEOPHILUS BROWN, OF MOLINE, ILLINOIS, ASSIGNOR TO DEERE AND COMPANY, A CORPORATION OF ILLINOIS.

COUPLING FOR VEHICLES.

1,163,611.  Specification of Letters Patent.  Patented Dec. 7, 1915.

Application filed August 9, 1915. Serial No. 44,581.

*To all whom it may concern:*

Be it known that I, THEOPHILUS BROWN, a citizen of the United States, residing at Moline, in the county of Rock Island and State of Illinois, have invented certain new and useful Improvements in Couplings for Vehicles, of which the following is a specification, reference being had therein to the accompanying drawing.

My invention relates to vehicles particularly that class employed as field kitchens for army or other purposes in which two or more vehicles are connected to be hauled together, and the object of my invention is to provide a simple, effective and durable flexible coupling by which one vehicle can be attached in line to another.

Referring to the accompanying drawings in which similar numerals indicate identical parts—Figure 1 is a plan view of a train of vehicles commonly known as an army kitchen. Fig. 2 is a side elevation of Fig. 1. Fig. 3 is a bottom plan view, and Figs. 4 and 5 are details.

The train of vehicles shown comprises a supply cart 1 and a kitchen 2; the supply cart 1 is supported on wheels 3 journaled on an axle 4, and the kitchen 2 is supported in a similar manner on wheels 5 journaled on an axle 6. Bars 7 and 8, preferably angle bars, are riveted or otherwise secured to the bottom of the cart 1; the forward ends of the bars 7 and 8 are secured to the bottom of the cart 1 on opposite sides thereof and adjacent to the axle 4, and converge rearwardly to a yoke shaped member 9 to which they are fastened by bolts or rivets. On opposite sides of the kitchen 2, and embracing the axle 6, are plates 10 secured to the sides of the kitchen 2 and extending below the bottom thereof; to these plates 10 I bolt or rivet bars 11 and 12 which converge forwardly and are secured to the bottom of the kitchen 2. The bars 11 and 12 are preferably angle bars and project forward of the kitchen 2 to a plate 13, or the like, to which they are rigidly connected.

To the plate 13, preferably to the under side thereof, I secure bearings 14 and 15 in which is adapted to freely oscillate a coupling member 16; to prevent longitudinal play of the member 16, I provide a shoulder 17 thereon which contacts with the forward face of the bearings 15, and on the rear end of the member 16 I secure a collar 18 in contact with the rear of the bearing 14. The forward end of the member is formed into a loop 19 which is adapted to enter between jaws or projections 20 and 21 on the yoke 9 where it is pivotally held by a bolt 22 which passes vertically through the jaws 20 and 21 and the loop 19.

By the construction shown and described it will be seen the strain of the draft when the train is moving is brought more directly upon the axles adding to the durability of the vehicles, and by providing a flexible coupling the cart 1 and kitchen 2 can follow a turn or inequalities of the ground without undue strain.

What I claim is—

1. A train comprising a plurality of vehicles, bars secured to one vehicle on opposite sides of the bottom thereof and converging rearwardly, a yoke connecting the rear ends of said bars and extending beyond the rear of said vehicle, bars secured to the other vehicle on opposite sides of the bottom thereof and converging forwardly to a point forward thereof, a plate connecting the last mentioned bars, and means on said plate and yoke to flexibly couple one vehicle with the other.

2. A train comprising a plurality of vehicles, bars secured to one vehicle on opposite sides of the bottom thereof and converging rearwardly, a yoke connecting the rear ends of said bars and extending beyond the rear of said vehicle, plates secured on opposite sides of the other vehicle and projecting below the bottom thereof, bars secured to said plates and to the bottom of the second vehicle and converging forwardly thereof and having a plate connecting their forward ends, and means on said plate engaging with means on the yoke to flexibly couple one vehicle with the other.

3. A train comprising a plurality of vehicles, bars secured to one vehicle on opposite sides of the bottom thereof and converging rearwardly, a yoke connecting the rear ends of said bars and extending beyond the rear of said vehicle, bars secured to the other vehicle on opposite sides of the bottom thereof and converging forwardly on said bottom, to a point forward of said vehicle, a plate connecting the last mentioned bars, bearings secured on said plate, a longitudinally and horizontally disposed coupling member adapted to oscillate in said bearings and connected to the yoke by a vertical pivot.

In testimony whereof I affix my signature, in presence of two witnesses.

THEOPHILUS BROWN.

Witnesses:
JESSIE SIMSER,
W. G. DUFFIELD.